United States Patent
Park

(10) Patent No.: US 7,052,432 B2
(45) Date of Patent: May 30, 2006

(54) SIX-SPEED POWERTRAIN OF AN AUTOMATIC TRANSMISSION OF A VEHICLE

(75) Inventor: Jong Sool Park, Suwon (KR)

(73) Assignee: Hyundai Motor Company, Seoul (KR)

( * ) Notice: Subject to any disclaimer, the term of this patent is extended or adjusted under 35 U.S.C. 154(b) by 101 days.

(21) Appl. No.: 10/670,892

(22) Filed: Sep. 24, 2003

(65) Prior Publication Data

US 2004/0106490 A1    Jun. 3, 2004

(30) Foreign Application Priority Data

Dec. 3, 2002    (KR) .................... 10-2002-0076294

(51) Int. Cl.
*F16H 3/44*    (2006.01)
(52) U.S. Cl. .................. 475/284; 475/269; 475/271; 475/275; 475/276; 475/279; 475/280
(58) Field of Classification Search ............... 475/269, 475/271, 275, 276, 279, 280, 284
See application file for complete search history.

(56) References Cited

U.S. PATENT DOCUMENTS 6,517,463 B1 *    2/2003    Sugiura et al. ............. 475/287
6,648,791 B1 *   11/2003    Kao et al. .................... 475/296
6,669,595 B1 *   12/2003    Raghavan et al. .......... 475/275
6,669,597 B1 *   12/2003    Usoro et al. ................ 475/323
6,736,750 B1 *    5/2004    Lee et al. .................... 475/276
6,743,146 B1 *    6/2004    Usoro et al. ................ 475/296
6,802,795 B1 *   10/2004    Miyazaki et al. ........... 475/275
2005/0020399 A1 *    1/2005    Gumpoltsberger .......... 475/275

FOREIGN PATENT DOCUMENTS

| JP | 2000-240741 | | 5/2000 |
| JP | 2001032889 A | * | 2/2001 |
| WO | WO 3054420 A1 | * | 7/2003 |

* cited by examiner

*Primary Examiner*—Charles A Marmor
*Assistant Examiner*—David D. Le
(74) *Attorney, Agent, or Firm*—Morgan Lewis & Bockius LLP

(57) ABSTRACT

The present invention provides a powertrain of an automatic transmission that includes first, second, and third planetary gear sets. The first planetary gear set has first, second, and third operational elements that occupy sequential positions in a lever diagram. The second planetary gear set has fourth, fifth, and sixth operational elements that occupy sequential positions in the lever diagram. The third planetary gear set has seventh, eighth, and ninth operational elements that occupy sequential positions in the lever diagram.

10 Claims, 8 Drawing Sheets

|     | C1 | C2 | C3 | B1 | B2 |
|-----|----|----|----|----|----|
| D1  |    | O  |    | O  |    |
| D2  |    | O  |    |    | O  |
| D3  | O  | O  |    |    |    |
| D4  |    | O  | O  |    |    |
| D5  | O  |    | O  |    |    |
| D6  |    |    | O  |    | O  |
| REV | O  |    |    | O  |    |

FIG. 5 A

| | |
|---|---|
| $Z_{R1}/Z_{S1}=$ | 2.982 |
| $Z_{R2}/Z_{S2}=$ | 2.208 |
| $Z_{R3}/Z_{S3}=$ | 1.566 |

FIG. 5 B

| | Gear ratio |
|---|---|
| D1 | 3.982 |
| D2 | 2.162 |
| D3 | 1.417 |
| D4 | 1.000 |
| D5 | 0.741 |
| D6 | 0.610 |
| R1 | −3.458 |

FIG. 5C

Rotation speed of each element (relative to input element)

| | S1 | PC1 | R1 | S2 | PC2 | R2 | S3 | PC3 | R3 | IN | OUT | P1 | P2 | P3 |
|---|---|---|---|---|---|---|---|---|---|---|---|---|---|---|
| D1 | 1.000 | 0.251 | 0.000 | 1.000 | 0.000 | 0.453 | -0.393 | 0.000 | 0.251 | 1.000 | 0.251 | -0.756 | -1.656 | 0.651 |
| D2 | 1.000 | 0.463 | 0.282 | 1.000 | 0.000 | 0.453 | 0.000 | 0.282 | 0.463 | 1.000 | 0.463 | -0.543 | -1.656 | 0.468 |
| D3 | 1.000 | 0.706 | 0.607 | 1.000 | 0.000 | 0.453 | 0.453 | 0.607 | 0.706 | 1.000 | 0.706 | -0.297 | -1.656 | 0.256 |
| D4 | 1.000 | 1.000 | 1.000 | 1.000 | 0.000 | 0.453 | 1.000 | 1.000 | 1.000 | 1.000 | 1.000 | 1.000 | -1.656 | 0.000 |
| D5 | 1.000 | 1.349 | 1.000 | 1.000 | 0.000 | 0.453 | 0.453 | 1.000 | 1.349 | 1.000 | 1.349 | 0.353 | -1.656 | 0.906 |
| D6 | 1.000 | 1.639 | 1.000 | 1.000 | 0.000 | 0.453 | 0.000 | 1.000 | 1.639 | 1.000 | 1.639 | 0.644 | -1.656 | 1.656 |
| R1 | -1.152 | -0.289 | 0.000 | 1.000 | 0.000 | 0.453 | 0.453 | 0.000 | -0.289 | 1.000 | -0.289 | -1.301 | -1.656 | -0.750 |

FIG. 5 D

Slip speeds of non-operated friction elements (relative to input element)

|     | C1    | C2    | C3    | B1    | B2    | SUM    |
|-----|-------|-------|-------|-------|-------|--------|
| D1  | 0.846 | 0.000 | 1.000 | 0.000 | 0.393 | 2.239  |
| D2  | 0.453 | 0.000 | 0.718 | 0.282 | 0.000 | 1.453  |
| D3  | 0.000 | 0.000 | 0.393 | 0.607 | 0.453 | 1.453  |
| D4  | 0.547 | 0.000 | 0.000 | 1.000 | 1.000 | 2.547  |
| D5  | 0.000 | 0.467 | 0.000 | 1.000 | 0.453 | 1.919  |
| D6  | 0.453 | 0.853 | 0.000 | 1.000 | 0.000 | 2.306  |
| R1  | 0.000 | 0.722 | 1.000 | 0.000 | 0.453 | 2.174  |
| SUM | 2.299 | 2.041 | 3.110 | 3.890 | 2.752 | 14.092 |

FIG. 5 E

Torque load (relative to input element)

| | S1 | PC1 | R1 | S2 | PC2 | R2 | S3 | PC3 | R3 | C1 | C2 | C3 | B1 | B2 |
|---|---|---|---|---|---|---|---|---|---|---|---|---|---|---|
| D1 | 1.000 | -3.982 | 2.982 | 0.000 | 0.000 | 0.000 | 0.000 | 0.000 | 0.000 | 0.000 | -2.982 | 0.000 | 2.982 | 0.000 |
| D2 | 1.000 | -3.982 | 2.982 | 0.000 | 0.000 | 0.000 | 1.162 | -2.982 | 1.820 | 0.000 | -2.982 | 0.000 | 0.000 | 1.162 |
| D3 | 0.655 | -2.609 | 1.954 | 0.345 | 0.417 | -0.761 | 0.761 | -1.954 | 1.192 | 0.761 | -1.954 | 0.000 | 0.000 | 0.000 |
| D4 | 0.251 | -1.000 | 0.749 | 0.000 | 0.000 | 0.000 | 0.000 | 0.000 | 0.000 | 0.000 | -0.749 | 0.749 | 0.000 | 0.000 |
| D5 | 0.000 | 0.000 | 0.000 | -0.214 | -0.259 | 0.473 | -0.473 | 1.214 | -0.741 | -0.473 | 0.000 | 1.214 | 0.000 | 0.000 |
| D6 | 0.000 | 0.000 | 0.000 | 0.000 | 0.000 | 0.000 | -0.390 | 1.000 | -0.610 | 0.000 | 0.000 | 1.000 | 0.000 | -0.390 |
| R1 | 0.000 | 0.000 | 0.000 | 1.000 | 1.208 | -2.208 | 2.208 | -5.666 | 3.485 | 2.208 | 0.000 | 0.000 | -5.666 | 0.000 |

FIG. 5 F

Power transmission route

|     | PG1 | PG2 | PG3 | SUM |
|-----|-----|-----|-----|-----|
| D1  | 1   | 0   | 0   | 1   |
| D2  | 1   | 0   | 1   | 2   |
| D3  | 1   | 1   | 1   | 3   |
| D4  | 0   | 0   | 0   | 0   |
| D5  | 0   | 1   | 1   | 2   |
| D6  | 0   | 0   | 1   | 1   |
| R1  | 0   | 1   | 1   | 2   |
| SUM | 3   | 3   | 6   | 12  |

SIX-SPEED POWERTRAIN OF AN AUTOMATIC TRANSMISSION OF A VEHICLE

CROSS-REFERENCE TO RELATED APPLICATIONS

This application claims priority of Korean Application No. 2002-0076294, filed on Dec. 3, 2002, the disclosure of which is incorporated fully herein by reference.

FIELD OF THE INVENTION

Generally, the present invention relates to an automatic transmission. More particularly, the present invention relates to a powertrain of an automatic transmission that realizes multiple shift speeds with a combination of a plurality of planetary gear sets.

BACKGROUND OF THE INVENTION

A typical shift mechanism of an automatic transmission utilizes a combination of a plurality of planetary gear sets. A powertrain of such an automatic transmission that includes the plurality of planetary gear sets changes rotating speed and torque received from a torque converter of the automatic transmission and accordingly changes and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a powertrain such as durability, efficiency in power transmission, and size depend a lot on the layout of combined planetary gear sets. Therefore, designs for a combining structure of a powertrain are also under constant investigation.

A manual transmission that has too many speeds causes inconvenience of excessively frequent shifting operations to a driver. Therefore, the positive features of more shift-speeds are more important for automatic transmissions because an automatic transmission automatically controls shifting operations basically without needing manual operation.

In addition to various developments regarding four and five speed powertrains, powertrains of automatic transmissions realizing six forward speeds and one reverse speed have recently been introduced, examples of which are found in U.S. Pat. No. 6,071,208 that was issued on Jun. 6, 2000, and in U.S. Pat. No. 5,226,862 that was issued on Jul. 13, 1993.

The powertrain discussed in U.S. Pat. No. 6,071,208, for example, includes a double pinion planetary gear set and a pair of single pinion planetary gear sets. A first carrier is fixedly connected to an input shaft, and a second carrier always operates as an output element. The disclosed powertrain includes six friction elements of two clutches and four brakes. However, it is preferable to use fewer friction elements to enable six forward speeds and one reverse speed so that an automatic transmission can be more light and compact.

The powertrain disclosed in U.S. Pat. No. 6,071,208 operates first and fourth brakes at a first speed, a first clutch and the first brake at a second speed, a second clutch and the first brake at a third speed, the first and second clutches and at a fourth speed, the second clutch and the fourth brake at a fifth speed, and the second clutch and the third brake at a sixth speed, respectively. The second and fourth brakes are operated at a reverse speed.

The design of this powertrain, however, leads to a number of disadvantages. For example, at the third forward speed, a first sun gear rotates at a speed of more than twice that of the rotation speed of the input shaft. In addition, the slip speed of the fourth brake which is not operated in the third speed, becomes as high as that of the first sun gear 18. The third forward speed is frequently engaged in the case that acceleration is needed, since a six-speed automatic transmission usually achieves the speed ratio of 1:1 at the fourth forward speed. Therefore, durability of an automatic transmission deteriorates if an element always rotates at a high speed in such a shift speed.

Also, slip speeds of friction elements are excessive for all speed ranges, which deteriorates durability of the automatic transmission and also causes excessive power loss. Therefore, the powertrain could be improved to have lesser slip speeds of friction elements for speeds D2–D6. In particular, the sum of slip speeds of friction elements becomes excessively large at the sixth forward speed D6, and therefore, the durability problem is at its maximum at the sixth forward speed.

In addition, when considering the number of planetary gear sets that take part in power transmission, at least two planetary gear sets take part in the power transmission for the fifth and sixth speeds, which deteriorates power efficiency. It is preferable that efficiency of power transmission is improved.

The six speed powertrain disclosed in U.S. Pat. No. 5,226,862 includes a double pinion planetary gear set and a pair of single pinion planetary gear sets. The input shaft is variably connected to second and third sun gears that are fixedly interconnected, a second carrier and a first sun gear, through first, second, and third clutches, respectively. A third carrier always operates as an output element, and a first carrier is fixed to the transmission housing 7. Also, first and second ring gears and the second carrier and a third ring gear and the second and the third sun gears are fixedly interconnected, respectively. The powertrain further includes a first brake that can stop rotation of the fixedly interconnected second carrier and third ring gear and a second brake that can stop the fixedly interconnected first and second ring gears.

This powertrain perates the first clutch and the first brake at a first speed, the first clutch and the second brake at a second speed, the first clutch and the third clutch at a third speed, the first and the second clutches at a fourth speed, the second and third clutches at a fifth speed, and the second clutch and the second brake at a sixth speed, respectively. The third clutch and the first brake are operated at a reverse speed. In particular, at the fourth speed, the first sun gear rotates at a speed of more than twice that of the rotation speed of the input shaft. The third forward speed is frequently engaged in the case that acceleration is needed, since a six-speed automatic transmission usually achieves the speed ratio of 1:1 at the fourth forward speed. Therefore, durability of an automatic transmission deteriorates if an element always rotates at a high speed in such a shift-speed.

Furthermore, at the fourth speed, the speed of a first planetary gear (i.e., pinion gear of the first planetary gear set) is almost 3.8 times that of the input shaft. This kind of high relative revolution speed may cause critical harm to durability of planetary gear sets. So, it is believed that this powertrain is not appropriate for use for automotive vehicles unless the durability is substantially supplemented.

The information disclosed in this Background of the Invention section is only for enhancement of understanding of the background of the invention, and should not be taken as an acknowledgement or any form of suggestion that this information forms the prior art that is already known to a person skilled in the art.

SUMMARY OF THE INVENTION

An exemplary powertrain of an automatic transmission according to an embodiment of the present invention includes first, second, and third planetary gear sets. The first planetary gear set has first, second, and third operational elements, and the first, second, and third operational elements occupy sequential positions in a lever diagram. The second planetary gear set has fourth, fifth, and sixth operational elements, and the fourth, fifth, and sixth operational elements occupy sequential positions in a lever diagram. The third planetary gear set has seventh, eighth, and ninth operational elements, and the seventh, eighth, and ninth operational elements occupy sequential positions in a lever diagram.

Preferably, the first operational element is fixedly connected to the fourth operational element and always receives an input torque. The second operational element is fixedly connected to the seventh operational element and always outputs an output torque. The third operational element is variably connected to either of the eighth operational element or the ninth operational element via a second clutch. The fifth operational element is variably connected to the ninth operational element via a first clutch. The sixth operational element is always stationary. The eighth operational element is variably connected to an input shaft via a third clutch and is subject to a stopping operation of a first brake. The ninth operational element is subject to a stopping operation of a second brake.

In a further embodiment, the third operational element is variably connected to the eighth operational element via the second clutch. It is preferable that the first and second planetary gear sets are single pinion planetary gear sets; the first, second, and third operational elements are respectively a sun gear, a carrier, and a ring gear of the first planetary gear set; and the fourth, fifth, and sixth operational elements are respectively a ring gear, a carrier, and a sun gear of the second planetary gear set.

It is also preferable that the third planetary gear set is a double pinion planetary gear set, and the seventh, eighth, and ninth operational elements are respectively a sun gear, a ring gear, and a carrier of the third planetary gear set.

It is also preferable that the first, second, and third planetary gear sets are arranged in the order of the first, third, and second planetary gear sets.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIGS. 5A–5F are charts showing operation states of a power train of an automatic transmission according to a preferred embodiment of the present invention.

DETAILED DESCRIPTION OF THE PREFERRED EMBODIMENTS

A preferred embodiment of the present invention will hereinafter be described in detail with reference to the accompanying drawings.

Figures 1, 2:
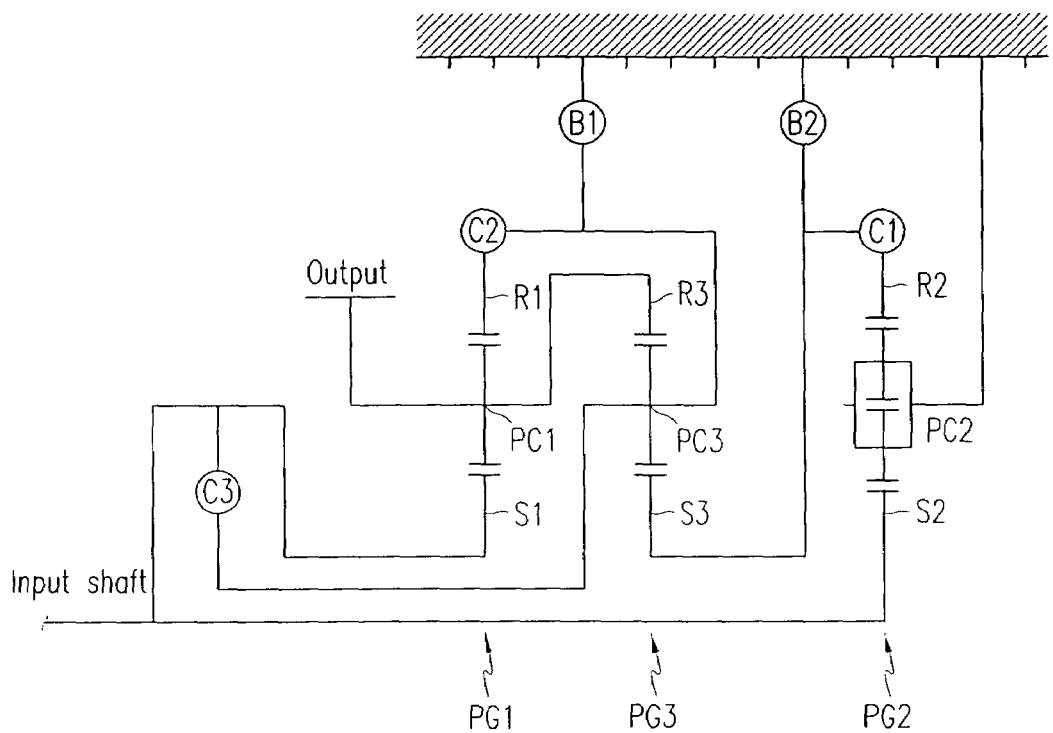
FIG. 1 illustrates a powertrain of an automatic transmission according to a preferred embodiment of the present invention.
FIG. 2 is an operational chart for a powertrain of an automatic transmission according to a preferred embodiment of the present invention.

As shown in FIG. 1, a power train of an automatic transmission of the present invention includes first, second, and third planetary gear sets PG1, PG2, and PG3. The first planetary gear set is a single pinion simple planetary gear set, and includes a first sun gear S1, a first pinion carrier (called "carrier" hereinafter) PC1, and a first ring gear R1. The second planetary gear set is a double pinion simple planetary gear set, and includes a second sun gear S2, a second carrier PC2, and a second ring gear R2. The third planetary gear set is a single pinion simple planetary gear set, and includes a third sun gear 53, a third carrier PC3, and a third ring gear R3. The first, second, and third planetary gear sets PG1, PG2, and PG3 are arranged in the order of the first, third, and second planetary gear sets PG1, PG3, and PG2, from an input shaft.

The first sun gear S1 and the second sun gear S2 are fixedly connected to the input shaft, respectively. The third carrier PC3 is connected to the input shaft interposing a third clutch C3. The first carrier PC1 and the third ring gear R3 are fixedly interconnected, and the first carrier PC1 always operates as an output element. The first ring gear R1 and the third carrier PC3 are variably interconnected via a second clutch C2. The third sun gear S3 and the second ring gear R2 are variably interconnected via a first clutch C1.

A powertrain of the present embodiment further includes a first brake B1 that can stop the rotation of the third carrier PC3, and a second brake B2 that can stop the rotation of the third sun gear S3. The second carrier PC2 of the second planetary gear set PG2 is fixed to the transmission housing such that it is always stationary.

As shown in FIG. 2, a powertrain of the present embodiment enables forward six speeds plus reverse one speed by operating the second clutch C2 and the first brake B1 at a first forward speed D1, the second clutch C2 and the second brake B2 at a second speed D2, the first clutch C1 and the second clutch C2 at a third speed D3, the second clutch C2 and the third clutch C3 at a fourth speed D4, the first clutch C1 and the third clutch C3 at the fifth speed D5, the third clutch C3 and the second brake B2 at a sixth speed D6, and the first clutch C1 and the first brake B1 at a reverse speed R.

Figure 3:
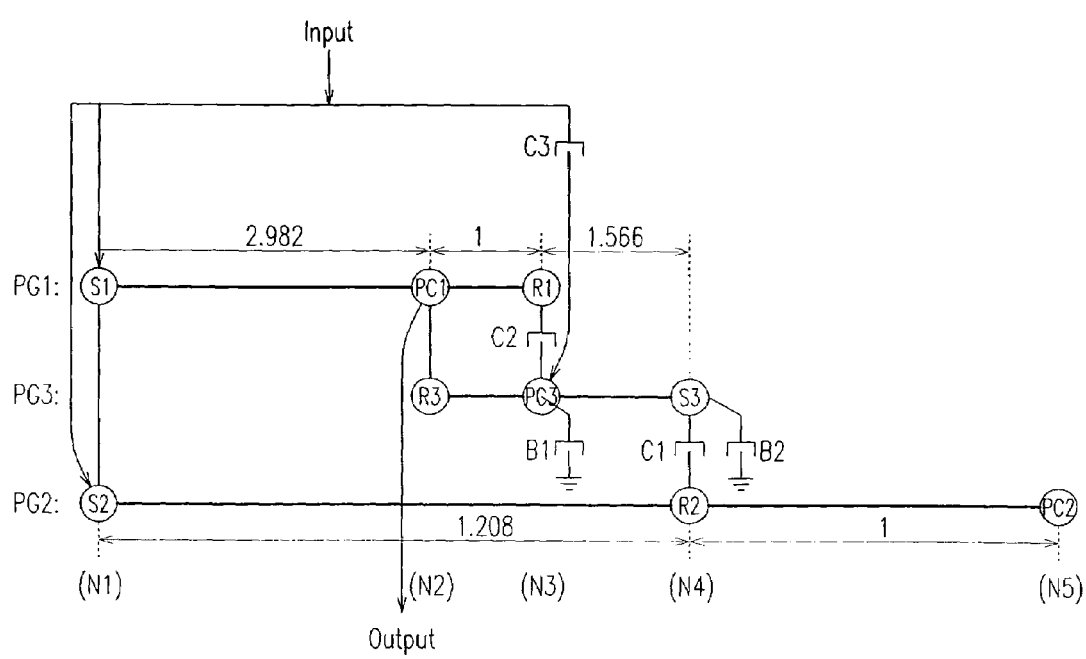
FIG. 3 is a lever diagram showing nodes N1–N5 of a powertrain of an automatic transmission according to a preferred embodiment of the present invention.

Shifting operation of a powertrain of the present embodiment according to the operational chart shown in FIG. 2 is hereinafter described in detail with reference to its lever diagram and speed diagram. FIG. 3 is a lever diagram showing nodes N1–N5 of a powertrain of an automatic transmission according to a preferred embodiment of the present invention.

As shown in FIG. 3, the first sun gear S1, the second carrier PC1, and the first ring gear R1 of the first planetary gear set PG1 are sequentially located in the lever diagram, and are denoted as operating nodes N1, N2, and N3. The third ring gear R3, the third carrier PC3, and the third sun gear S3 of the third planetary gear set PG3 are also sequentially located in the lever diagram. The third ring gear R3 and the third carrier PC3 respectively correspond to the second and third operating nodes N2 and N3, and the third sun gear S3 is denoted as a new operating node N4 shown to the right of the node N3. The second sun gear S2, the second ring gear R2, and the second carrier PC2 of the second planetary gear set PG2 are also sequentially located in the lever diagram. The second sun and ring gears S2 and R2 respectively correspond to the first and fourth nodes N1 and N4, and the second carrier PC2 is denoted as a new operating node N5 shown to the right of the node N4.

Each operating node is positioned based on the specification of the planetary gear sets shown in FIG. 5A. For better comprehension, the lever for the second planetary gear set PG2 is shown in a scale different from that of the first and third planetary gear sets PG1 and PG3.

Figure 4:
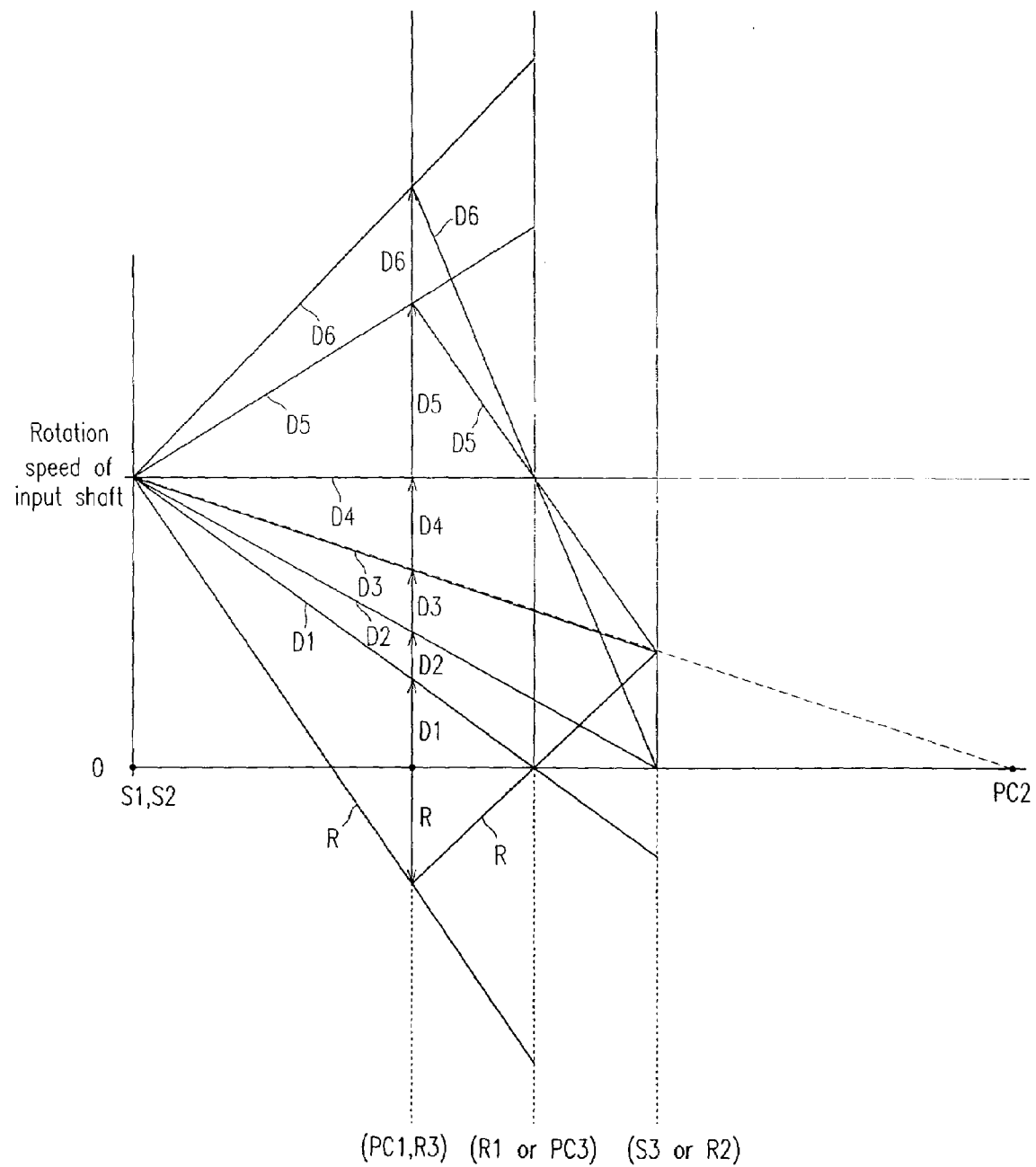
FIG. 4 is a speed diagram of a powertrain of an automatic transmission according to a preferred embodiment of the present invention.

FIG. 4 is a speed diagram of a powertrain of an automatic transmission according to a preferred embodiment of the present invention. In more detail, the speed diagram is drawn based on the gear ratios of the planetary gear sets as shown in FIG. 5A.

As described above, the second sun gear S2 of the second planetary gear set PG2 is fixedly connected to the input shaft, and the second carrier PC2 is always stationary. Therefore, the speed line for the second planetary gear set PG2 also becomes stationary (refer to a dotted line in FIG. 4).

In addition, the first sun gear S1 of the first planetary gear set PG1 is fixedly connected to the input shaft. Therefore, the first operating node N1 (i.e., operational elements correspondent thereto) rotates at the same speed as the input shaft.

In addition, the first planetary gear set PG1 and the third planetary gear set PG3 form four nodes, i.e., first, second, third, and fourth operating nodes N1, N2, N3, and N4 during the forward first through fourth speeds D1–D4, because the second clutch C2 remains in operation at those speeds (refer to FIG. 3).

Having the second clutch C2 operated, shifting operation during first through fourth speeds D1–D4 of the powertrain of the present embodiment is as follows.

At the first speed, the rotation speed of the third node N3 becomes zero (0) because the first brake B1 is operated. Therefore, the rotation speed at the first speed D1 of the first carrier PC1 (the output element) is found by a first speed line designated by "D1".

At such a first speed, the first sun gear S1 operates as the input element, the first ring gear R1 connected to the third carrier PC3 functions as a reaction element, and the first carrier PC1 functions as an output element. Therefore, only the first planetary gear set PG1 takes part in the power transmission at the first speed.

At the second speed, the first brake B1 is released and the second brake B2 operates. Now, the third sun gear S3 (an element at the fourth node N4) stops its rotation by the operation of the second brake B2. Therefore, the rotation speed of the output element PC1 at the second speed is found by a second speed line designated by "D2", and the second speed line shows that the output element PC1 rotates faster at the second speed than at the first speed.

At such a second speed, the first and third planetary gear sets PG1 and PG3 take part in the power transmission.

At the third speed, the first clutch C1 operates in addition to the operation of the second clutch C2. Therefore, the third sun gear S3 and the second ring gear R2 on the fourth node N4 rotate at the same speed. Accordingly, at this third speed, all the operating elements in the first, second, and third planetary gear sets PG1–PG3 lie on the same speed line designated by "D3" in FIG. 4.

At such a third speed, all the first, second, and third planetary gear sets PG1, PG2, and PG3 take part in the power transmission.

At the fourth speed, the third clutch C3 operates. In this case, the third carrier PC3 rotates with the input shaft, and the first ring gear R1 that is connected to the third carrier PC3 by the currently operating second clutch C2 also rotates with the input shaft. As a result, the first and third planetary gear sets PG1 and PG3 rotate as a whole (i.e., without a relative movement of elements in the gear sets PG1 and PG3) with the input shaft.

Therefore, a fourth speed line for the first and third planetary gear sets PG1 and PG3 at the fourth speed becomes a horizontal line designated by "D4" in FIG. 4.

At such a fourth speed, the gear sets PG1 and PG3 rotate as a whole, and the power is directly transmitted from the input shaft to the output shaft without causing a relative movement or rotation of elements in the gear sets PG1 and PG3. Therefore, no planetary gear set effectively takes part in the power transmission.

Now the shifting operation at the fifth, sixth, and reverse speeds is described in detail.

At the fifth, sixth, and reverse speeds, the second clutch C2 is released such that speed lines for the first planetary gear set PG1 and the third planetary gear set PG3 are separated.

At the fifth speed, the first clutch C1 is operated, and accordingly, the third sun gear S3 of the third planetary gear set PG3 rotates with the second ring gear R2 of the second planetary gear set PG2. In addition, the third clutch C3 is operated, and accordingly, the third carrier PC3 of the third planetary gear set PG3 rotates with the input shaft.

Therefore, the third ring gear R3 rotates faster than the input shaft. The first carrier PC1 (i.e., the output element) fixedly connected to the third ring gear R3 also rotates with the third ring gear R3, i.e., faster than the input shaft (refer to speed lines designated by "D5" in FIG. 4).

At such a fifth speed, the first planetary gear set PG1 does not take a torque load for the power transmission: the second and third planetary gear sets PG2 and PG3 take the load for the power transmission.

At the sixth speed, the third carrier PC3 of the third planetary gear set PG3 rotates with the input shaft due to the operation of the third clutch C3, as it does at the fifth speed.

However, the third sun gear S3 of the third planetary gear set PG3 stops its rotation because the second brake B2 is operated. In this case, the speed line for the third planetary gear set PG3 at the sixth speed is rotated clockwise from that at the fifth speed.

Therefore, the third ring gear R3 rotates faster at the sixth speed than at the fifth speed, and accordingly, the first carrier PC1 directly connected to the third ring gear R3 also rotates faster than at the fifth speed (refer to speed lines designated by "D6" in FIG. 4).

At such a sixth speed, the first planetary gear set PG1 does not take a torque load for the power transmission, only the third planetary gear set PG3 takes the load for the power transmission.

At the reverse speed, the first clutch C1 is operated, and accordingly, the third sun gear S3 of the third planetary gear set PG3 rotates with the second ring gear R2 of the second planetary gear set PG2. In addition, the first brake B1 is operated such that the third carrier PC3 stops its rotation, and therefore, the third ring gear R3 has a negative rotation speed, i.e., rotation opposite to that of the input shaft.

Therefore, the first carrier PC1 fixedly connected to the third ring gear R3 also has negative rotation speed, and accordingly the reverse speed is achieved.

At such a reverse speed, the first planetary gear set PG1 does not take torque load for the power transmission: the second and third planetary gear sets PG2 and PG3 take the load for the power transmission.

FIG. 5A shows detailed specifications of the powertrain according to one embodiment, i.e., gear ratios of each planetary gear set. FIG. 5B shows speed ratios in each shift-speed of the powertrain of such an embodiment obtained by the detailed specification of FIG. 5A. FIG. 5C shows rotation speeds of each operational element relative to that of the input element, for each shift-speed. FIG. 5D shows slip speeds of friction elements at each shift-speed. FIG. 5E shows torque loads that each operational element or each friction element undertakes. FIG. 5F shows planetary gear sets that take part in power transmission in each shift-speed.

Details shown in FIG. 5F are apparent from the above description of shifting operation of the powertrain of the present invention, and the numbers shown in FIGS. 5C–5E may be calculated by a person skilled in the art based on the structural features and operational chart of the powertrain of the present embodiment.

According to the powertrain of a preferred embodiment, no operational element rotates faster than the input shaft at the third speed that is frequently engaged for acceleration (refer to FIG. 5C), and therefore, slip speeds of friction elements not operated at the third speed are less than the rotation speed of the input shaft (refer to FIG. 5D).

When the performance shown in FIG. 5D is compared with performance of prior art powertrains, it is apparent that the powertrain of the present embodiment shows less slip speeds of friction elements overall at the second to sixth speeds than the powertrains of, for example, U.S. Pat. Nos. 6,071,208 and 5,226,862.

Also, it is well known that more planetary gear sets implies more loss of power during power transmission. When the performance shown in FIG. 5F is compared with prior art powertrains, it is apparent that the powertrain of the present invention has less planetary gear sets involved in the power transmission at many of the shift-speeds and accordingly shows better power efficiency.

According to a preferred embodiment of the present invention, six forward speeds and one reverse speed are achieved with a minimized number of friction elements such that an automatic transmission becomes light and compact. Durability is increased due to reduction of rotation speeds of operational elements at a shift-speed frequently engaged for acceleration. A further increase of durability and reduction of power loss is also achieved by reduction of slip speeds of friction elements. A shortened route of power transmission also contributes to an increase of durability and reduction of power loss.

In addition, dominant usage of single pinion planetary gear sets also contributes to reduction of power loss.

In addition, layout of the output element toward the input shaft enables easy installation of an automatic transmission for a front-wheel drive vehicle.

Furthermore, the torque steer effect of a front-wheel drive vehicle can be reduced because the length difference of left and right drive shafts is reduced since the planetary gear set directly connected to the output shaft is positioned toward the input shaft.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. The prior art of record fails to show or render obvious an arrangement of the claimed powertrain comprising a first planetary gear set, a second planetary gear set, a third planetary gear set, three clutches, two brakes, and one stationary member, as recited in the claim; specifically, wherein the arrangement of the claimed powertrain includes:

The first operational element is fixedly connected to the fourth operational element and always receives an input torque;

The second operational element is fixedly connected to the ninth operational element and always outputs an output torque;

The third operational element is variably connected to the eighth operational element via a second clutch;

The fifth operational element is always stationary;

The sixth operational element is variably connected to the seventh operational element via a first clutch;

The seventh operational element is subject to a stopping operation of a second brake; and The eighth operational element is variably connected to an input shaft via a third clutch and is subject to a stopping operation of a first brake.

2. The powertrain of claim 1, wherein:

the first and third planetary gear sets are single pinion planetary gear sets;

the first, second, and third operational elements are respectively a sun gear, a carrier, and a ring gear of the first planetary gear set; and the seventh, eighth, and ninth operational elements are respectively a sun gear, a carrier, and ring gear of the third planetary gear set.

3. The powertrain of claim 1, wherein:

the second planetary gear set is a double pinion planetary gear set; and the fourth, fifth, and sixth operational elements are respectively a sun gear, a carrier, and a ring gear of the second planetary gear set.

4. The powertrain of claim 1, wherein the first, second, and third planetary gear sets are arranged in the order of the first, third, and second planetary gear sets.

5. The prior art of record fails to show or render obvious an arrangement of the claimed powertrain as rectied in the claim; specifically wherein the arrangement of the claimed powertrain includes:

A first operational element is fixedly connected to a fourth operational element, and configured to always received an input torque;

A second operational element is fixedly connceted to a ninth operational element and configured to always output an output torque;

A third operational element is variably connceted to an eighth operational element via a second clutch;

A sixth operational element is variably connceted to a seventh operational element via a first clutch;

A fifth operational element is configured to be stationary;

The eighth operational element is variably connected to an input shaft via a third clutch and is subject to a stopping operation of a first brake; and The seventh operational is subject to a stopping operation of a seconed brake.

6. The powertrain of claim 5, wherein:

the first, second and third operation elements comprise a first planetary gear set;

the fourth, fifth and sixth operational elements comprise a second planetary gear set; and the seventh, eighth and ninth operational elements comprise a third planetary gear set.

7. The prior art of record fails to show or render obvious an arrangement of the claimed powertrain comprising a first planetary gear set, a second planetary gear set, a third planetary gear set, an input shaft, and an output shaft, as recited in the claim; specifically, wherein the arrangement of the claimed powertrain includes:

The first sun gear is fixed to the second sun gear;

The first pinion carrier is fixed to the third ring gear;

The first ring gear is variably connected with the third pinion carrier;

The second pinion carrier is always stationary;

The second ring gear is variably connected with the third sun gear;

The input shaft is fixed to the first and second sun gears, and variably connected with the third pinion carrier; and The output shaft is fixed to the first pinion carrier and the third ring gear.

8. The powertrain of claim 7, wherein said first and third planetary gear sets are single pinion planetary gear sets.

9. The powertrain of claim 7, wherein said second planetary gear set is a double pinion planetary gear set.

10. The powertrain of claim 7, wherein said first, second, and third planetary gear sets are arranged in the order of the first, third, and second planetary gear sets.

* * * * *